United States Patent [19]
Bell

[11] 4,001,329
[45] Jan. 4, 1977

[54] ANILINE BASED REACTION PRODUCT
[75] Inventor: Reuben H. Bell, Granville, Ohio
[73] Assignee: Owens-Corning Fiberglas Corporation, Toledo, Ohio
[22] Filed: Feb. 25, 1974
[21] Appl. No.: 445,408
[52] U.S. Cl. .................. 260/570 D; 260/2.5 AQ; 260/347.8
[51] Int. Cl.$^2$ .................. C07C 87/28; C07C 91/40
[58] Field of Search .................. 260/570 D
[56] References Cited
UNITED STATES PATENTS

| | | | |
|---|---|---|---|
| 3,134,755 | 5/1964 | Muller et al. | 260/72.5 |
| 3,245,924 | 4/1966 | Cox et al. | 260/2.5 |
| 3,336,245 | 8/1967 | Britain | 260/570 X |
| 3,423,344 | 1/1969 | Odinak et al. | 260/570 X |

Primary Examiner—Robert V. Hines
Attorney, Agent, or Firm—John W. Overman; Patrick P. Pacella

[57] ABSTRACT

A reaction product between propoxylated aniline, formaldehyde and diethanol amine is disclosed. In another embodiment, aromatic compounds can be reacted with the propoxylated aniline in addition to the formaldehyde and diethanol amine. The resulting product can be reacted with an alkylene oxide to produce a polyol which can be employed in the production of polyurethane foams.

8 Claims, No Drawings

ANILINE BASED REACTION PRODUCT

This invention relates to propoxylated aniline based compositions. More specifically this invention relates to propoxylated aniline based polyols useful in the production of polyurethane foams.

Polyurethane foams have found widespread utility in the fields of insulation and structural reinforcement. The basic chemistry of producing polyurethane foams is well known. These cellular plastics are formed by the reaction of polyol compounds with organic isocyanates. Normally, catalysts, blowing agents, surfactants, flame retardants and the like are included in a polyurethane reaction.

One method for producing aniline based polyols is a reaction between aniline and formaldehyde in the presence of hydrochloric acid. Such a reaction often leaves free aniline which finds its way into waste streams. Aniline is a toxic material and its presence in waste streams is undesirable.

I have now discovered that by first propoxylating the aniline and then reacting it with formaldehyde and diethanol amine, that about 99% of the aniline can be tied up in the reaction product. In another embodiment, materials such as hydroxy or alkanol substituted aromatic compounds can be reacted with the propoxylated aniline in addition to the formaldehyde and diethanol amine. These products can be used as epoxy hardeners or as phenolic resin modifiers. These reaction products also can be reacted with an alkylene oxide such as propylene oxide to produce a polyol composition. The resulting polyol is useful in the production of polyurethane foams and is capable of use in spray systems as well as pour in place and molding applications.

The mole ratio of propoxylated aniline to formaldehyde to diethanol amine is 1 to 10: 1 to 8: 0.1 to 4. Preferably, this mole ratio is 1 to 6: 1 to 4: 0.1 to 2.5. When a hydroxy or alkanol substituted aromatic compound is employed in addition to these materials, the mole ratio of aromatic compound ranges from 0.5 to 4, preferably 0.5 to 2.

The hydroxy or alkanol substituted aromatic compounds employed in this invention vary widely. If an alkanol substituted aromatic compound is employed the alkanol radical generally has 1 to 12 carbon atoms. Specific examples of these aromatic compounds include phenol and furfuryl alcohol.

The alkylene oxides employed in this invention have at least 2 carbon atoms and are represented by the formula

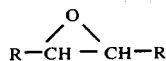

wherein each R is hydrogen or an alkyl radical having 1 to 12 carbon atoms. Examples of these alkylene oxides are 1,2-propylene oxide, 1,2-ethylene oxide, 1,2-butylene oxide, 1,2-heptylene oxide, 3,4-octylene oxide, 2,3-nonylene oxide and the like.

The propoxylated aniline, formaldehyde and diethanol amine are reacted together under acidic conditions. Normally, the free formaldehyde content is reduced to less than 5% prior to the addition of the diethanol amine. When an aromatic compound is employed, it generally is added with the propoxylated aniline and formaldehyde prior to the addition of diethanol amine. Generally the reactions are carried out under reflux with heating and cooling applied as necessary. After the reactions are completed, water is stripped from the product under vacuum and heat. The alkylene oxide, under reflux, then is added to the product. When the reaction is completed, the product is stripped of excess alkylene oxide under vacuum.

In another embodiment, the acidic reaction product is made alkaline with a base such as K OH, NaOH and the like to a pH of 9. Water is stripped. Alkylene oxide then is added to the basic product as described above and followed by the addition of an acid such as 20% sulfuric acid to neutralize the product. After neutralization, any water and excess alkylene oxide are removed by stripping.

Urethanes or polyurethanes can be formed by a variety of methods, although the most widely used product method is the reaction of di- or polyfunctional hydroxyl compounds, for example, hydroxyl-terminated polyesters or polethers, with di- or polyfunctional isocyanates. The general structure of a linear polyurethane derived from a dihydroxy compound, HOROH, and a diisocyanate, OCNR'NCO, can be represented by the following general formula:

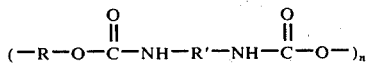

Suitable isocyanates or reactive -NCO containing compounds which may be employed in practicing the invention include: 2,4 toluene diisocyanate; 2,6-toluene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'dimethoxy-4,4'-biphenylene diisocyanate; 1-methoxy phenylene-2,4-diisocyanate; diphenylene-4,4' diisocyanate, 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3-methyl-4,6,4'-triisocyanate diphenylmethane; 2,4,4'-triisocyanate diphenyl; 2,4,4'-triisocyanate diphenyl ether; long chain hydrocarbons and substituted hydrocarbons terminated with —NCO radicals and mixtures thereof. Prepolymers having reactive isocyanate or —NCO groups may also be used.

Other polyols (hydroxy terminated or polyhydric compounds) which may be reacted with the isocyanate containing compounds include by way of example: polyalkylene ether glycols, triols and so forth having up to 8 hydroxyl groups, and the polyhydric polyesters obtained by the reaction of a dicarboxylic acid with one or more polyhydric alcohols such as diol, triol, tetrol to produce a hydroxy terminated polyester. Examples of polyhydric compounds include branched chain polyols of hydroxyl terminated condensation products of propylene oxide or of mixed ethylene and propylene oxides or other alkylene oxides with polyhydric alcohols of 2 to 8 hydroxyl groups such as with ethylene glycol, glycerol, 1,3,6-hexanetriol, pentaerythritol, sorbitol, sucrose, and methyl glucoside, or with diamines, and triamines linear polyols such as dipropylene glycol, tripropylene glycol, polypropylene ether glycol, polyisopropylene ether glycol, polyethylene propylene ether glycol, polyethylene ether glycol, polyhexamethylene ether glycol, polytetramethylene ether glycol and liquid hydroxy terminated polyesters formed by reaction of a dicarboxylic acid such as adipic or sebacic acid or their anhydrides with one or more of the above glycols or with a small amount of a higher polyol, e.g. hexanetriol, or pentaerythritol to give some branching. Small amounts of amines or amino alcohols can also be used in making polyesters.

Rigid, low density polyurethane foams can be prepared by reacting the polyols of this invention with the polyisocyanates in the presence of a suitable catalyst, a blowing agent, and generally a surfactant. This invention works well for both the one-shot technique and the pre-polymer approach.

The amount of polyisocyanate used will vary slightly but in general the total —NCO equivalent to total polyol active hydrogen equivalent should be greater than one.

The foaming operation if affected by means of incorporating the blowing agent in the foam forming constituents. It can be water or a low boiling, inert liquid, which vaporizes below the temperature of the foaming mass. The preferred blowing agents are certain halogen-substituted aliphatic hydrocarbons. In rigid foams intended for use as insulation the incorporation of a gas lowers the foam's heat conductivity and results in obtaining a better K-factor. All of these methods are known in the art.

Preferred blowing agents are fluorocarbons such as trichloromonofluoromethane, dichlorofluoromethane and the like. The weight of blowing agents used is varied depending on the foam density desired.

Catalysts are commonly used to increase the rate of the isocyanate polyol reaction. A wide variety of compounds can be used. Tertiary amines are commonly used for this purpose. Tetramethylquanidine is preferably used in practicing this invention. Other commonly employed catalysts are triethylamine, dimethylethanolamine and diethylenetriamine, as well as tin, lead and cobalt containing compounds.

When producing urethane foams it is useful in many cases to use a surfactant which serves to regulate rigid foam cell size. The surfactants most frequently used are high molecular weight, liquid silicones. The weight of a surfactant used is generally between 0.5 and 1.5% by weight of the polyol.

The advantages of this invention are illustrated by the following examples. The reactants, proportions and other specific conditions are presented as being typical and should not be construed to limit the invention unduly.

EXAMPLE I

Propylene oxide (3712 grams) was added dropwise to 2976 grams of aniline at 130° C. Formaldehyde (1624 grams) was added as a 37% solution to the propoxylated aniline and the mixture was stirred until homogeneous. Formic acid (87 grams) was added to the mixture. The resulting mixture then was heated to reflux and kept there until the free formaldehyde content was about 3%. The mixture was cooled to 75° C and diethanol amine (840 grams) was added. An exotherm occurred. The reaction temperature was increased to 95° C and kept there for 1 hour. Water was stripped from the product under vacuum and heat. Propylene oxide (1400 grams) was added dropwise to the resin at a temperature ranging from 105° to 131° C. The resulting product was heated for 1 hour at 120° C after the propylene oxide addition was completed. The product was stripped of excess propylene oxide under vacuum. The resulting product had a hydroxyl number of 535.

EXAMPLE II

Propoxylated aniline was prepared according to the procedure described in Example I. Phenol was added to the propoxylated aniline followed by formic acid. The mixture was heated to 65° C and formaldehyde was added as a 37% solution proportionwise so as to control the temperature below 90° C. The mixture was heated to reflux and kept there until the free formaldehyde content was about 3%. The mixture was cooled to 75° C and diethanol amine was added to the mixture. an exotherm occurred. The mixture was heated at 95° C for 1 hour and then stripped of water under vacuum at 150° C. Propylene oxide was added dropwise at 132° C. The mole ratio of phenol to propoxylated aniline to formaldehyde to diethanol amine employed in this example was 1:2:2.5:0.7. The resulting product had a hydroxyl number of 460.

EXAMPLE III

The procedure of Example II was repeated except that furfuryl alcohol was employed instead of phenol. The mole ratio of furfuryl alcohol to propoxylated aniline to formaldehyde to diethanol amine employed in this example was 1:2: 2.4: 0.7. The resulting product had a hydroxyl number of 437.

EXAMPLE IV

| Ingredient | Weight, grams | | |
| --- | --- | --- | --- |
| | Example I | Example II | Example III |
| Isocyanate - polyphenyl Polymethylene polyisocyanate | 101.5 | 100.0 | 101.0 |
| Polyol - Reaction Product of Example I, II or III | 40.0 | 39.0 | 38.5 |
| Polyol - propoxylated diethylene triamine | 9.9 | 10.0 | 10.0 |
| Polyol - Bis (2-hydroxyethyl) aminomethylphosphonate | 5.0 | — | — |
| ethylene glycol | — | 6.0 | 6.5 |
| Flame Retardant - tris (2-chloroethyl) phosphate | 10.0 | 10.0 | 10.0 |
| Surfactant - silicone glycol copolymers with direct silicone carbon bonds | 0.7 | 0.7 | 0.7 |
| Catalyst - Dibutyltin Dilaurate | 0.4 | 0.3 | 0.3 |
| Blowing Agent - trichlorofluoromethane | 34.0 | 34.0 | 34.0 |

The samples were prepared by the one-shot method comprising adding the surfactant and flame retardant material to the polyol. The blowing agent then was added followed by the water and catalyst. The runs were completed by spraying the isocyanate and resin components onto cardboard. The isocyanate and resin components reacted to form a polyurethane foam. The foam was sprayed as several layers, one on top of the other, to give a sample thickness of about 4 inches.

| NCO/OH Index | 1.38 | 1.17 | 1.19 |
|---|---|---|---|
| Density lbs./cu.ft. | 2.16 | 2.01 | 2.00 |

Samples of these polyurethane foams were tested for flammability according to the following procedure. A sample of each foam was mounted in a vertical chimney with a wire glass front and ignited with a Bunsen burner for ten seconds. The percent by weight by each foam sample were recorded.

| Percent Weight Retention | 78.1 | 70.1 | 77.8 |
|---|---|---|---|

A review of these properties reveals that the aniline based polyols of this invention are well suited for use in the production of plastic foams such as polyurethane foams.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

I claim:

1. An acid condensation product formed by reacting, under acidic conditions, propoxylated aniline, formaldehyde and diethanol amine, having a mole ratio of propoxylated aniline to formaldehyde to diethanol amine of 1 to 10: 1 to 8: 0.1 to 4, wherein the propoxylated aniline is a reaction product of propylene oxide and aniline.

2. A product according to claim 1 wherein the mole ratio of propoxylated aniline to formaldehyde to diethanol amine is 1 to 6: 1 to 4: 0.1 to 2.5.

3. A composition according to claim 1 wherein the composition is formed from phenol in addition to the propoxylated aniline, formaldehyde and diethanol amine, wherein the mole ratio of propoxylated aniline to formaldehyde to diethanol amine to phenol is 1 to 10: 1 to 8: 0.1 to 4: 0.5 to 4.

4. A composition according to claim 3 wherein the mole ratio of propoxylated aniline to formaldehyde to diethanol amine to phenol is 1 to 6: 1 to 4: 0.1 to 2.5: 0.5 to 2.

5. A polyol composition formed by reacting alkylene oxide with the composition of claim 1.

6. A polyol composition formed by reacting alkylene oxide with the composition of claim 3.

7. A polyol composition according to claim 6 wherein the alkylene oxide is propylene oxide.

8. A polyol composition according to claim 6 wherein the alkylene oxide is propylene oxide.

* * * * *